United States Patent [19]

Chivers

[11] 4,359,683

[45] Nov. 16, 1982

[54] MICROWAVE INTERFEROMETER

[75] Inventor: John W. H. Chivers, Duffield, England

[73] Assignee: Rolls-Royce Limited, London, England

[21] Appl. No.: 196,113

[22] Filed: Oct. 10, 1980

[30] Foreign Application Priority Data

Nov. 7, 1979 [GB] United Kingdom ............... 7938552

[51] Int. Cl.³ ........................................... G01R 27/04
[52] U.S. Cl. ............................................... 324/58.5 B
[58] Field of Search ....................... 324/58.5 B, 58 B

[56] References Cited

U.S. PATENT DOCUMENTS 4,045,727 8/1977 Glover .......................... 324/58.5 B
4,087,745 5/1978 Kennedy, Jr. et al. ........... 324/58 B
4,281,285 7/1981 Bastida .......................... 324/58.5 B

FOREIGN PATENT DOCUMENTS 52-35600 3/1977 Japan ............................. 324/58.5 B Primary Examiner—Stanley T. Krawczewicz
Attorney, Agent, or Firm—Cushman, Darby & Cushman

[57] ABSTRACT

A microwave interferometer comprising a source of microwave energy the output of which is equally divided between an antenna and a short circuit. The antenna is adapted for the transmission of microwave energy to and the subsequent reception of reflected microwave energy from an object in close proximity to the antenna. The phase difference between the microwave radiation reflected from the short circuit and the object is directly proportional to the distance between the antenna and the object.

8 Claims, 2 Drawing Figures

MICROWAVE INTERFEROMETER

This invention relates to a microwave interferometer and in particular to a microwave interferometer adapted for the measurement of small distances.

There is a requirement for a device which is capable of the non-contacting measurement of small distances, especially in hostile environments. Thus, for example, it is desirable to be able to measure the clearances between the tips of rotating aerofoil blades in a gas turbine engine and their surrounding casing. The magnitude of these clearances is highly important to the efficiency of the engine and their monitoring is therefore desirable in the management of engine efficiency. However, the high velocities and temperatures of the gases which are acted upon by the aerofoil blades preclude the use of many conventional prior art measurement devices.

It is an object of the present invention to provide apparatus suitable for the measurement of small distances in hostile environments.

According to the present invention, apparatus suitable for the measurement of small distances comprises a source of microwave energy, means adapted to equally divide the output of said microwave energy source between two waveguides, one waveguide terminating in a short circuit and the other in an antenna, said antenna being tapered to terminate in an aperture of smaller cross-sectional area than the remainder of its associated waveguide, and adapted for the transmission of microwave energy to and the subsequent reception of reflected microwave energy from an object in close proximity to said antenna, and means adapted to detect the phase difference between said microwave energy reflected from said short circuit and said microwave energy reflected from said object and provide an output which is a function of said phase difference and is proportional to the distance between said antenna and said object.

Preferably the waveguides between said means adapted to equally divide the output of said microwave energy source and said short circuit and said antenna respectively are of equal cross-sectional area and length, and situated adjacent each other.

Said means adapted to equally divide the output of said microwave energy source between said two waveguides is preferably a hybrid tee.

Said means adapted to detect the phase difference between said microwave energy reflected from said short circuit and said microwave energy reflected from said object is preferably a double balanced mixer, the output of which is a voltage which is a function of said phase difference and is proportional to the distance between said antenna and said object.

Said microwave energy is preferably within the frequency range 20 GHz to 40 GHz.

Said aperture in said antenna is preferably provided with a window which is transparent to microwave energy.

Said window may be formed from mica or sapphire.

Each of said waveguides is preferably provided with a directional coupler adapted to direct said microwave energy reflected from said short circuit and said antenna into said double balanced mixer.

Said waveguides and said antenna may each be of rectangular cross-sectional shape.

The invention will now be described with reference to the accompanying drawings in which.

Figure 1:
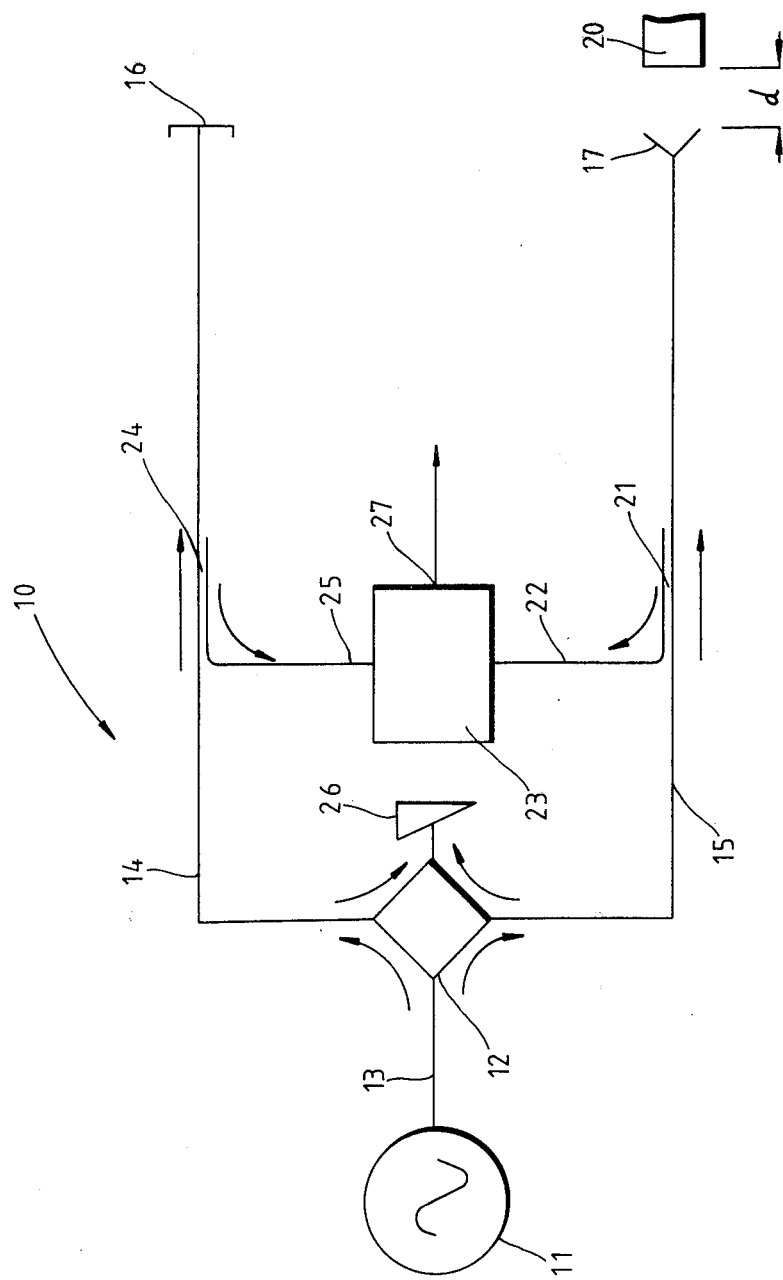
FIG. 1 is a diagrammatic representation of a microwave interferometer in accordance with the present invention.

With reference to FIG. 1, a microwave interferometer generally indicated at 10 comprises a source of microwave energy 11 which is adapted to direct microwave energy into a hybrid tee 12 through a waveguide 13. The frequency of the microwave energy is within the range 20 GHz to 40 GHz. The hybrid tee 12 serves to equally divide the microwave energy between first and second similar rectangular cross-section waveguides 14 and 15. The first waveguide 14 terminates in a short circuit 16 and the second waveguide 15 terminates in an antenna 17.

The waveguides 14 and 15 are of the same cross-sectional shape and area, the same length and are situated adjacent each other. However in the interests of clarity they are shown spaced apart in the diagrammatic representation of FIG. 1.

Figure 2:
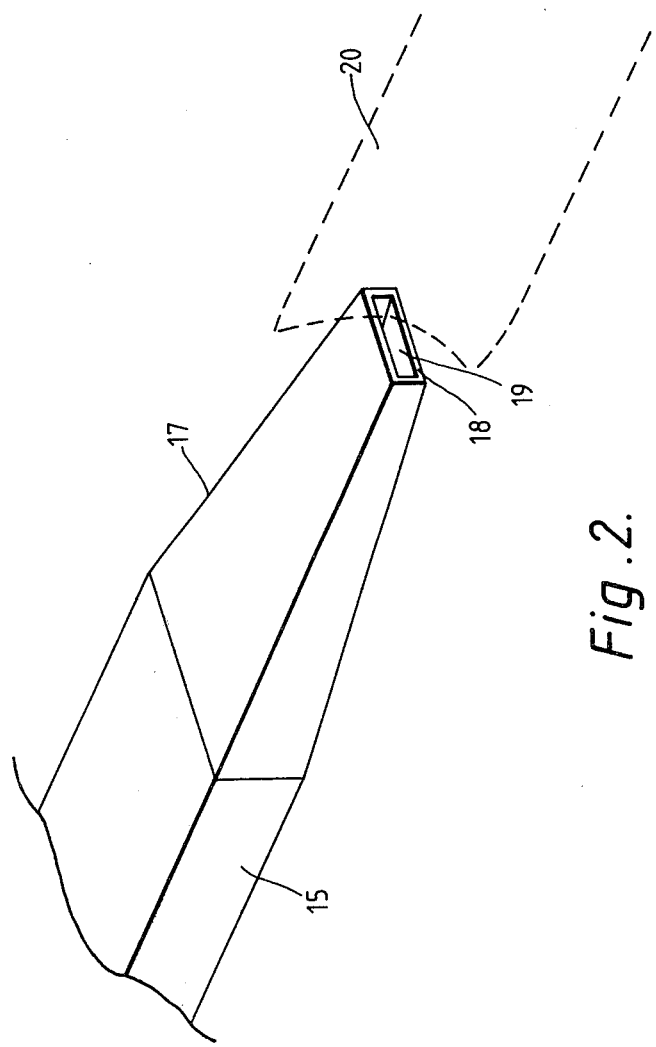
FIG. 2 is a perspective view of the antenna of the microwave interferometer shown in FIG. 1.

The antenna 17 can be seen more clearly in FIG. 2 and is of tapered form. It terminates in an aperture 18 which is rectangular and provided with a mica window 19. The mica window 19 is adapted to permit the passage of microwave energy through the aperture 18 whilst at the same time preventing contamination entering the waveguide 15. It will be appreciated, however, that other materials which are transparent to microwave energy, such as a thin sheet of sapphire, could be used in place of the mica.

The antenna 17 is situated so that its aperture 18 is in close proximity to the tips of an annular array of rotary aerofoil blades 20, part of one of which can be in full lines in FIG. 1 and in broken lines in FIG. 2. The microwave energy passing through the waveguide 15 and into the antenna 17 is transmitted through the antenna aperture 18 to the tips of the aerofoil blades 20. At least some of that transmitted microwave energy is reflected by the aerofoil blade 20 tips and re-enters the waveguide 15 through the aperture 18. It passes along a portion of the waveguide 15 before encountering a directional coupler 21. The directional coupler 21 extracts the majority of the reflected microwave energy and directs it into a waveguide 22 which in turn directs the microwave energy into the radio frequency port of a double balanced mixer 23.

The microwave energy directed to the short circuit 16 is reflected by the short circuit 16 and travels back up the waveguide 14 before encountering a directional coupler 24. The directional coupler 24 is identical to the directional coupler 21 and serves to extract a major portion of the reflected microwave energy and direct it into a waveguide 25 identical to the waveguide 22 which in turn directs the microwave energy into the local oscillator port of the double balanced mixer 23.

Not all of the reflected microwave energy is directed into the double balanced mixer 23 by the directional couplers 21 and 24. That which continues travelling along the waveguides 14 and 15 re-enters the hybrid tee 12 and is directed thereby to an absorbing termination 26.

Since the waveguides 14, 15, 22 and 25 are of identical length, the two channels of microwave energy entering the double balanced mixer 23 are out of phase as a result of the distance d between the antenna 17 and the tips of the blade 20. Moreover the degree to which the two channels of microwave energy are out of phase is proportional to the distance d. The double balanced mixer is adapted to provide an output voltage from its intermediate frequency output port 27 the magnitude of which is a function of the phase difference between the two channels of microwave energy and thus the distance d between the antenna 17 and the tips of the aerofoil blades 20.

It will be seen therefore that if the antenna 17 is situated such that its aperture 18 is flush with the wall of the casing in which the aerofoil blades 20 are mounted, the distance d will be equal to the clearance between the tips of the blade 20 and the casing wall.

Since the waveguides 14 and 15 are identical and located adjacent each other, they will be subject to the same variations in dimensions resulting from temperature variation. This being so, errors in the magnitude of the indicated distance d resulting from temperature variations in the microwave interferometer 10 will be minimised.

Since the antenna 17 is tapered to terminate in an aperture 18 which is of smaller cross-sectional area than the remainder of the waveguide 15, it may be utilised in physically confined locations. We have found that the most effective microwave energy frequency range with an antenna of this type is 20 GHz to 40 GHz. The microwave interferometer 10 in accordance with the present invention thus finds great utility in gas turbine engines where space is at a premium.

I claim:

1. Apparatus for measuring distance, comprising:
    a source of microwave energy;
    a first waveguide terminated in a short circuit;
    a second waveguide having a length and a cross-sectional area equal to the length and cross-sectional area, respectively, of the first waveguide and positioned substantially adjacent to said first waveguide;
    means for dividing energy from said source equally between said first and second waveguides;
    an antenna coupled to said second waveguide, tapered so as to terminate in an aperture of smaller cross-section area than that of the first and second waveguides for transmitting microwave energy to an object to be measured and receiving therefrom microwave energy reflected thereby; and
    means for detecting a phase difference between microwave energy reflected from said object and microwave energy reflected from said short circuit and providing an output signal proportional to said phase difference, the phase difference being related to the distance between said antenna and said object.

2. Apparatus as claimed in 1 wherein said dividing means is a hybrid tee.

3. Apparatus as claimed in claim 1 wherein said detecting means is a double balanced mixer, the output of which is a voltage which is a function of said phase difference and is proportional to the distance between said antenna and said object.

4. Apparatus as claimed in claim 1 wherein said microwave energy is within the frequency range 20 GHz to 40 GHz.

5. Apparatus as claimed in claim 1 wherein said aperture in said antenna is provided with a window which is transparent to microwave energy.

6. Apparatus as claimed in claim 5 wherein said window is formed from a material selected from the group consisting of mica and sapphire.

7. Apparatus as claimed in claim 3 wherein each of said waveguides is provided with a directional coupler adapted to direct said microwave energy reflected from said short circuit and said antenna into said double balanced mixer.

8. Apparatus as claimed in claim 1 wherein said waveguides and said antenna are each of rectangular cross-sectional shape.

* * * * *